Feb. 3, 1931.  G. W. PIKE  1,791,083
FISHHOOK
Filed Dec. 14, 1927

G. W. Pike, INVENTOR.

Witnesses

Patented Feb. 3, 1931

1,791,083

UNITED STATES PATENT OFFICE

GEORGE W. PIKE, OF PHOENIX, ARIZONA

FISHHOOK

Application filed December 14, 1927. Serial No. 240,000.

This invention relates to a fish hook and has for its primary object a construction incorporating a plurality of movably mounted hooks that are automatically released for movement to extended or active position when an element of the structure is engaged by a fish.

An object of the invention is the provision of spring means normally under tension but automatically releasable for forcibly moving a plurality of hooks to position to bring about effective penetration of the same into the mouth of the fish.

Another object of the inventon is the novel construction of release device capable of either being directly operated by contact of an element thereof with the fish or by the line when subjected to a predetermined tension.

A feature of the invention is the novel manner of mounting a group of hooks for movement toward and away from each other so as to be capable of assuming a very compact arrangement when in an inactive position, but to extend at a considerable distance when in an active position to assure a positive engagement of the hooks with the mouth of a fish.

Besides the above my invention is distinguished in the use of a spring actuated mechanism automatically releasable for swinging a group of hooks to an operative position.

Figure 1:
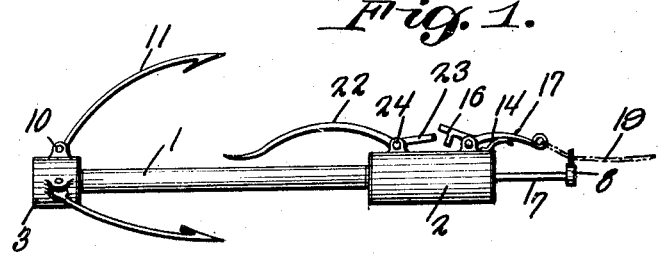
Figure 2:
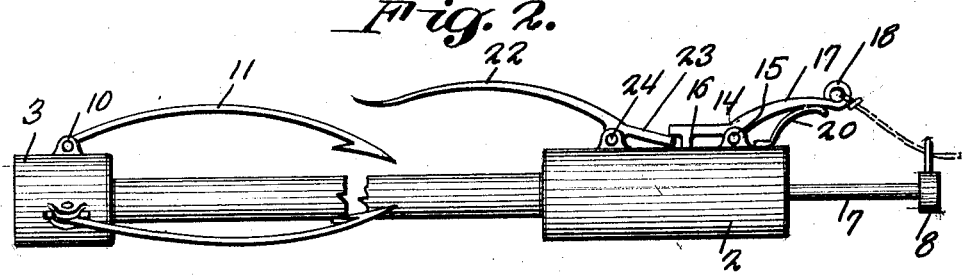
Figure 3:
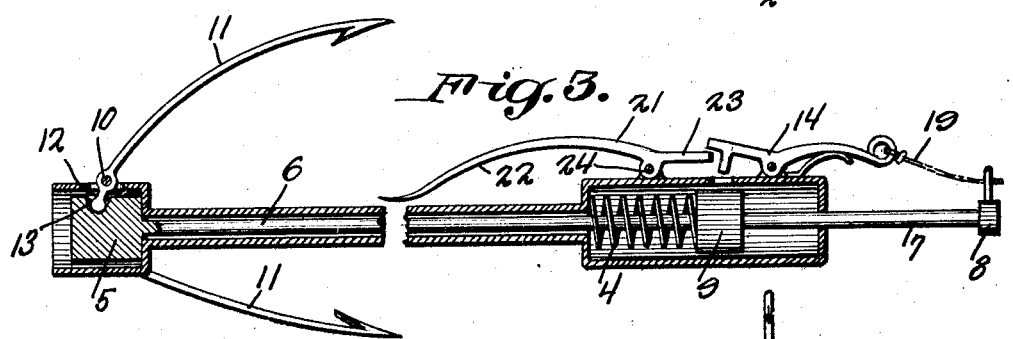
Figure 4:
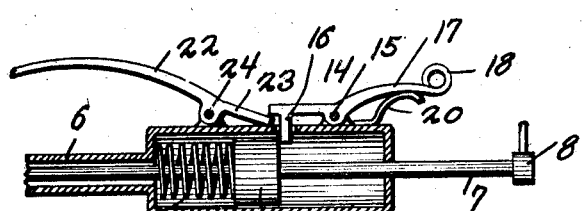
Figure 5:
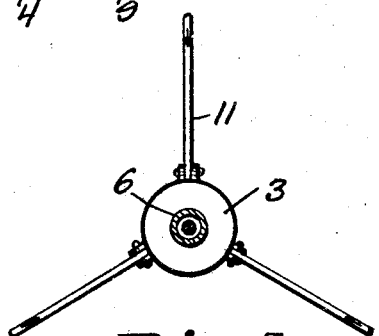

With these and other objects in view, the invention will be better understood from the following detailed description taken in connection with the accompanying drawings, wherein:

Figure 1 is a side elevation of the hook structure with the hooks in operative position, Figure 2 is a similar view with the hooks in an inoperative position, Figure 3 is a longitudinal sectional view, Figure 4 is a detailed sectional view showing the trigger in locking position, and Figure 5 is a cross sectional view.

Again referring to the drawings illustrating one of the many constructions of my invention, the numeral 1 designates the body of the hook structure which may be of any suitable configuration to attract fish but illustrated in its most simplified design so as to readily accommodate the mechanism asso ciated therewith. This body 1 is of tubular form and has arranged at one end a barrel 2 and at the other end a head 3, the former accommodating a compression spring 4 and the latter accommodating the slide 5. The slide 5 has projecting therefrom a stem 6 slidably mounted in the body 1 with one end portion 7 projecting therebeyond to have mounted thereon a guide 8. Associated with the spring 4 and fixed to the stem 7 is a stop 9 whereby the spring may be placed under tension in the sliding of the stem and slide in a predetermined direction.

Swingingly connected to the body by means of pivot pins 10 is a group of hooks 11 provided with fingers 12 loosely engaging in recesses 13 in the slide 5. Thus it will be appreciated that in the sliding movement of the slide the engagement between the fingers and walls of the recesses will cause the hooks to swing about their pivot pins to assume either an active or inactive position dependent upon the direction of movement of the slide 5. There is a decided advantage in this construction in that pressure upon the hooks in a direction toward each other will move the slide and stem in a direction to compress the spring 4 and when the hooks have assumed a very compact arrangement as clearly shown in Figure 2, the spring 4 has been fully compressed with the stop 9 positioned to have an interlocking engagement with the novel form of trigger 14 now to be described.

This trigger 14 is pivotally connected to the barrel 2 as indicated at 15 and is provided with a lug 16 for engagement with the stop 9 and is further provided with an arm 17 terminating in an eye 18 for connection with the fishing line 19. A spring 20 normally acts to force the trigger in a direction to hold the lug 16 in the path of movement of the slide 5 and due to the location of the eye 18 a pull upon the line 19 will swing the trigger about the pivot to retract the lug 16 out of engagement with the slide to allow the spring 4 to function.

It is desirable in practice to accomplish this result automatically in the act of the fish biting at the hook structure and to accomplish this desired result I employ a bait supporting trip 21 having a tang 22 for receiving the bait and provided with a bill 23 operatively engaging with the trigger so that when the trip is moved about its pivot 24 the bill 23 will actuate the trigger to allow the spring 4 to function and thereby throw the hooks 11 to an active position.

It will now be appreciated that I have produced a fish hook capable of automatically accomplishing a very effective engagement between the plurality of hooks and the mouth of a fish but which hooks when inactive assume a very compact position to facilitate the travel of the fish hook as a whole through the water and past obstructions in the water. In the act of biting at the hook to obtain the bait from the tang 22 the pressure of the jaws of the fish will depress the trip thereby throwing the trigger to a releasing position to allow the spring 4 to expand for moving the stem and slide in the required direction to forcibly throw the hooks to an active position to bring about an effective engagement of the hooks with the mouth of the fish. Should the fish fall short in its strike and only engage a portion of the structure, the pull created thereby will subject the line to enough tension to throw the trigger to a releasing position thereby swinging the hooks to active position to engage or penetrate the mouth of the fish. Thus it will be appreciated that I provide a double lock device which will be directly actuated by the fish or operated by the line when the line is subjected to a predetermined pull.

It is of course, to be understood that the body may be constructed in various designs well known in this art, and the hooks may be grouped in various other ways than illustrated and besides other forms of releasing and hook actuating mechanisms may be utilized for automatically throwing the hooks to an active position, therefore, I do not desire to be limited in protection in any manner whatsoever, except as set forth in the following claims.

What I claim is:

1. A fish hook structure comprising a tubular body provided with a hollow head at one end, a stem slidably mounted in said body and having an enlargement fitting slidably in said head and provided with recesses in its circumferential side, the said head being provided with slots located opposite said recesses, the inner walls of the recesses being arcuate, hooks pivotally mounted upon the head and having inner end portions extending through said slots and provided with terminal rounded enlargements engaging in said recesses, the hooks having their shanks extending rearwardly from their pivots and being spaced equidistantly about the body, a spring yieldably urging the stem in a direction to effect outward swinging movement of the hooks, a trigger, a stop upon the stem engaging the trigger whereby to restrain the stem against movement under the influence of said spring, in said direction, means yieldably holding the trigger in active position, and means upon the trigger for the connection thereto of a fishing line.

2. A fish hook structure comprising a tubular body provided with a hollow head at one end, a stem slidably mounted in said body and having a slide fitting slidably in said head and provided with recesses in its circumferential side, the said head being provided with slots located opposite said recesses, hooks pivotally mounted upon the head and having inner end portions extending through said slots and engaging in said recesses, a spring yieldably urging the stem in one direction, a trigger pivotally mounted upon the body, a lug upon the trigger, a stop upon the stem engageable with said lug, the stem extending rearwardly beyond the other end of the trigger, a spring holding the trigger in active position, an eye upon the rear end of the stem, and means upon the rear end of the trigger for connection thereto of a fishing line led through said eye, as and for the purposes set forth.

3. A fish hook structure comprising a tubular body provided with a hollow head at one end, a stem slidably mounted in said body and having a slide fitting slidably in said head, hooks pivotally mounted upon the head and having inner end portions movably engaging said head, a spring yieldably urging the stem in one direction, a trigger pivotally mounted upon the body, a lug upon the trigger, a stop upon the stem engageable with said lug, the stem extending rearwardly beyond the other end of the trigger, a spring holding the trigger in active position, an eye upon the rear end of the stem, and means upon the rear end of the trigger for connection thereto of a fishing line led through said eye, as and for the purposes set forth.

In testimony whereof I affix my signature.

GEORGE W. PIKE.